Oct. 10, 1961     E. E. HOPKINS     3,003,375
SIMPLIFIED INSULATION STRIPPING MECHANISM
Filed March 24, 1959
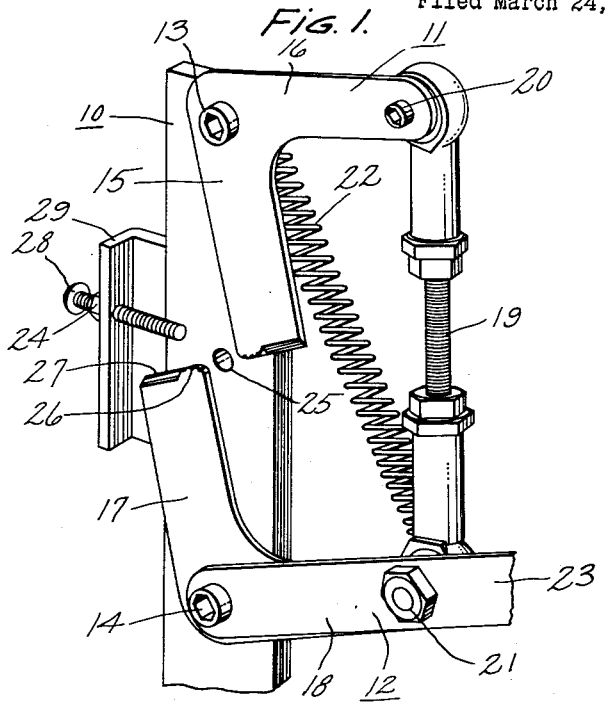
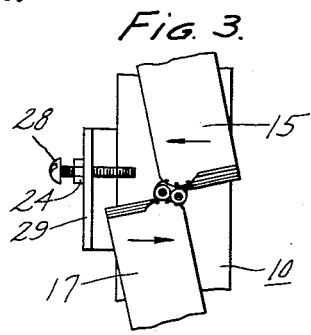
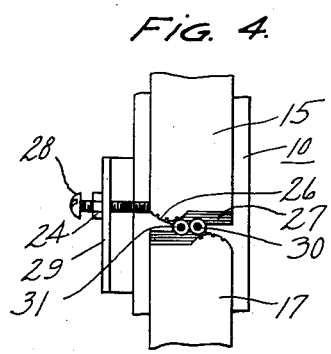
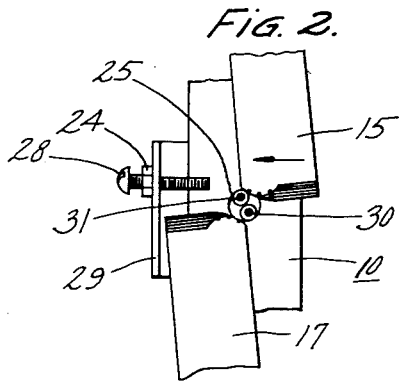
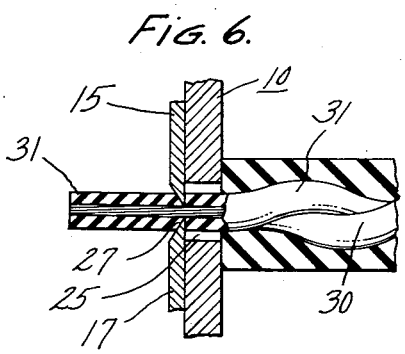
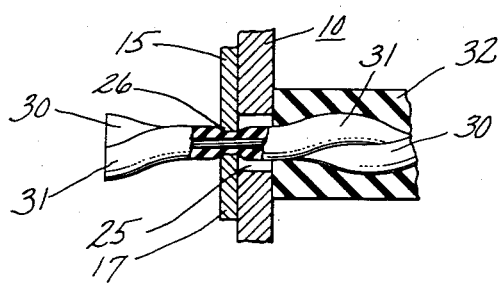
Inventor:
Earl E. Hopkins
by Richard L Caslin
His Attorney

# United States Patent Office 3,003,375
Patented Oct. 10, 1961

3,003,375
SIMPLIFIED INSULATION STRIPPING
MECHANISM
Earl E. Hopkins, Schenectady, N.Y., assignor to General
Electric Company, a corporation of New York
Filed Mar. 24, 1959, Ser. No. 801,570
5 Claims. (Cl. 81—9.51)

The present invention relates to a bench fixture or mechanism for stripping the insulation off the ends of electrical conductors. This invention is primarily designed for application with two-conductor cords but it is not limited to such use. This same mechanism is also usable with a single insulated conductor or with a three-conductor cord where the conductors are parallel.

In the past, difficulty has been experienced in stripping the insulation off of the conductors of a two-conductor cord where the conductors are spirally wound around each other and covered with an extruded jacket. The automatic machine that cuts the cord into the desired length also strips the jacket off of each end, leaving the insulated singles wrapped around each other. It is then necessary for the operator to unwind the conductor ends and place them carefully between a pair of W-shaped cutters that close together and sever a portion of the insulation on each conductor. Then the cord must be pulled out of the cutters to strip the insulation from the end of each conductor. This arrangement has two disadvantages. First, it doesn't cut completely around the insulation. Secondly, less cutting is done as the cutters wear down, and the cutters are not easily replaced.

The principal object of the present invention is to provide an insulation stripping mechanism for electrical cord wherein a rolling action is given to the ends of the conductors so as to sever portions of the insulation completely around the conductors.

A further object of the present invention is to provide an insulation stripping mechanism for an electrical cord comprising a pair of swinging knife blades that cause an insulated conductor to roll between the blades as the blades swing together, thereby severing the insulation around the entire periphery of the conductor.

A further object of the present invention is to provide and insulation stripping mechanism of the class described with an adjustable stop means for preventing the blades from closing together and damaging the conductors, as well as for adjusting the blades to make allowance for the wear of the cutting edges.

A preferred embodiment of the present invention comprises a fixed plate and a pair of bell crank levers that are each pivotally connected to the plate on one side thereof. A small aperture is formed through the plate for receiving the spirally wound insulated conductors. The principal type of cord that will be used with this mechanism has a rubber or vinyl jacket extruded over the spiral conductors. A portion of this jacket has been removed at each end of the cord by the automatic machine that cuts the cord into desired lengths. The operator will insert the spiral conductor ends through the aperture until the jacket engages the back surface of the fixed plate which prevents the cord from moving any further through the aperture. Each bell crank lever is joined to the other by a tie rod so that they both act in unison. One end of each lever is arranged closely adjacent the aperture in the plate. This end of each lever includes a cutting edge in cooperation with a serrated portion that starts to unwind the spiral conductors so that the cutting edges will score or sever the insulation as the conductors continue to rotate.

My invention will be better understood from the following description taken in connection with the accompanying drawing and its scope will be pointed out in the appended claims.

FIGURE 1 is a perspective view of a bench fixture embodying the present invention with the swinging knife blades shown in the normally open position.

FIGURE 2 is a fragmentary front view of the mechanism of FIGURE 1 after the knife blades have swung slightly toward each other to engage a pair of spirally wound conductors that protrude through the aperture in the fixed plate.

FIGURE 3 is a view similar to that of FIGURE 2 after the serrated portions of the blades have unwound the conductors until they are arranged side-by-side in a horizontal plane.

FIGURE 4 is another front view similar to FIGURES 2 and 3 showing the top knife blade engaging the adjustable stop at the left side of the fixed plate, thereby preventing any further closing of the blades.

FIGURE 5 is an enlarged cross-sectional view taken through the vertical center line through the aperture in the fixed plate when the serrated portions have clamped the spiral conductors as shown in FIGURE 3.

FIGURE 6 is an enlarged vertical cross-sectional view taken through the aperture in the fixed plate when the knife blades have reached the final closing position shown in FIGURE 4.

Referring in detail to the drawing and in particular to FIGURE 1, 10 represents a fixed plate which is vertically supported from a bench by means that are not shown. This fixed plate 10 has a pair of bell crank levers 11 and 12 that are pivotally mounted at points 13 and 14, respectively, on one side of the plate. The lever 11 has one arm that constitutes a swinging knife blade 15 and a second arm 16 to which an external force is applied to operate the lever. Similarly, the lever 12 has a swinging knife blade 17 and an actuator arm 18. The two levers are joined together by an adjustable tie rod 19 which is pivotally connected to arms 16 and 18 by connections 20 and 21, respectively. This establishes a four bar linkage with the fixed plate 10. A heavy duty coiled spring 22 is tensioned between the top of the fixed plate 10 and the lower pivotal connection 21 to hold the levers normally in the open position shown in FIGURE 1. The actuator arm 18 of the lever 12 has an extension 23 which is shown broken for illustration purposes due to a lack of sufficient space to depict its entire length. It should be understood that this extension arm may either be represented by a hand lever or it may extend down to the floor and be operated as a foot pedal.

The fixed plate has a small circular aperture 25 for receiving the insulated conductors of an electrical cord. Each knife blade 15 and 17 has a leading edge with a flattened serrated portion 26 and a sharpened cutting edge 27. The knife blades 15 and 17 are open when they are disposed generally parallel to each other on opposite sides of the aperture 25, as seen in FIGURE 1. A line connecting the pivotal axes 13 and 14 will intersect the center of the aperture 25. The knife blades 15 and 17 swing toward each other until in the closed position of the mechanism the blades are in vertical alignment, as seen in FIGURE 4. An adjustable stop is provided in the form of screw member 28 that is threaded through a side extension 29 of the plate 10. A lock nut 24 is threaded onto the screw 28 and tightened against the plate extension 29 to hold the stop means securely in place. If this stop means were not provided, the leading edges of the knife blades could swing closed. This, of course, would sever the conductors and would destroy the utility of this mechanism.

The cord is perhaps best shown in FIGURE 5 as comprising a pair of insulated singles 30 and 31 that are spirally wrapped around each other and then covered with an over-all jacket 32 of rubber or the like material. While the cord is being cut into desired lengths, the end of the jacket 32 will be removed to uncover the insulated singles 30 and 31. The mechanism of the present invention is designed to cut and strip the insulation from the single conductors. First, the insulated singles must be unwound and this is accomplished by the rolling action provided by the serrated portions 26 of the knife blades 15 and 17, respectively. These serrated portions are necessary so that the conductors will unwind and will not merely slip between the knife blades. The serrated portions of the knife blades will force the conductors to assume the least space which, of course, is an arrangement where the conductors lie side by side in a parallel relation as shown in FIGS. 3 and 5. Further swinging movement of the knife blades will bring the cutting edges 27 closer and closer to each other while continuing to roll the conductors, thereby scoring or ringing the insulation of each conductor. Finally, the operator will pull back on the cord after the knife blades have severed the insulation and come to a complete stop as illustrated in FIGURE 4. This action will strip the insulation from the individual conductors.

Modifications of this invention will occur to those skilled in this art and it is to be understood, therefore, that this invention is not limited to the particular embodiments disclosed but that it is intended to cover all modifications within the true spirit and scope of the invention as claimed.

What I claim as new and desire to secure by Letters Patent of the United States is:

1. An insulation stripping mechanism comprising a pair of knife blades which are joined together at their opposite ends, means for joining the knife blades together so that they will rotate in unison toward and away from each other, each knife blade having an edge for wedging an insulated cord therebetween, the edge of each knife blade having a flattened portion which first engages the cord whereby continued movement of the blades toward each other will compress the insulation of the cord, the edge of each knife blade having a cutting portion next to the flattened portion to sever the insulation down to the conductor.

2. An insulation stripping mechanism comprising a fixed plate and a pair of oppositely swinging knife blades which are pivotally mounted at one side of the plate, and means joining the knife blades so that they move in unison, an aperture formed through the plate for receiving an end of an electrical cord, the leading edge of each knife blade having a serrated portion and a cutting edge, whereby the serrated portions first engage the conductors of the cord and unwind them, while further swinging of the blade will cause the cutting edges to score or sever the insulation around the periphery of the conductors so that when a pulling force is exerted on the cord, the insulation will be stripped from the conductors.

3. An insulation stripping mechanism as recited in claim 2 with the addition of an adjustable stop means supported from the fixed plate to control the amount of swinging movement of the blades to insure that the cutting edges will not sever the conductors.

4. An insulation stripping mechanism comprising a support, a pair of spaced bell crank levers pivotally mounted on one side of said support, each of said levers having a cutting edge and a flattening means at one end, a connecting link pivotally joining the other ends of said levers so that rotary movement of one of said levers in one direction causes the rotary movement of the other of said levers in the same rotary direction, a small aperture formed in said support adjacent the cutting edge end of said levers for receiving the end of an insulated electrical cord therethrough, said levers swinging in unison to simultaneously move their respective flattening means and cutting edges toward said aperture to compress and sever insulation of a said cord.

5. An insulation stripping mechanism comprising a fixed plate, a pair of bell crank levers pivotally connected to the plate on one side thereof, a small aperture formed through the plate for receiving the end of an insulated electrical cord therethrough, each bell crank lever having a knife edge at one end and pivotally joined at its opposite end to the end of a connecting link, said levers rotating in the same rotary direction and swinging in unison so that the knife edges will move toward and away from the aperture in the plate, each knife edge including a serrated portion which is adapted to engage the cord first and flatten it out, and a knife edge cutting portion adapted to sever the insulation of the cord so that when the cord is pulled out of the aperture the insulation on the one end of the cord will be stripped therefrom.

References Cited in the file of this patent

UNITED STATES PATENTS

| | | |
|---|---|---|
| 1,011,157 | Chytraus | Dec. 12, 1911 |
| 1,675,838 | Bernard | July 3, 1928 |
| 2,334,577 | Postlewaite | Nov. 16, 1943 |
| 2,393,919 | Lucarelle et al. | Jan. 29, 1946 |
| 2,422,776 | Cunny et al. | June 24, 1947 |
| 2,559,866 | Gambrill | July 10, 1951 |